United States Patent [19]
Weinberg et al.

[11] Patent Number: 5,551,039
[45] Date of Patent: Aug. 27, 1996

[54] COMPILING A SOURCE CODE VECTOR INSTRUCTION BY GENERATING A SUBGRID LOOP FOR ITERATIVELY PROCESSING ARRAY ELEMENTS BY PLURAL PROCESSING ELEMENTS

[75] Inventors: Tobias M. Weinberg, Somerville; Lisa A. Tennies, Bedford; Alexander D. Vasilevsky, Watertown, all of Mass.

[73] Assignee: Thinking Machines Corporation, Bedford, Mass.

[21] Appl. No.: 315,662

[22] Filed: Sep. 30, 1994

Related U.S. Application Data

[63] Continuation of Ser. No. 827,945, Feb. 3, 1992, abandoned.

[51] Int. Cl.$^6$ .................................................. G06F 9/45
[52] U.S. Cl. ........................ 395/700; 395/375; 395/650; 395/500
[58] Field of Search ................................ 395/375, 500, 395/650, 700

[56] References Cited

U.S. PATENT DOCUMENTS

| | | | |
|---|---|---|---|
| 4,435,765 | 3/1984 | Uchida et al. | 395/550 |
| 4,598,400 | 7/1986 | Hillis | 370/60 |
| 4,685,076 | 8/1987 | Yoshida | 364/736 |
| 4,773,038 | 9/1988 | Hillis et al. | 395/500 |
| 4,821,181 | 4/1989 | Iwasawa et al. | 395/500 |
| 4,827,403 | 5/1989 | Steele, Jr. et al. | 395/800 |
| 4,939,638 | 7/1990 | Stephenson et al. | 395/375 |
| 4,984,235 | 1/1991 | Hillis et al. | 370/60 |
| 5,067,068 | 11/1991 | Iwasawa et al. | 395/650 |
| 5,073,970 | 12/1991 | Aoyama et al. | 395/800 |
| 5,088,034 | 2/1992 | Ihara et al. | 395/700 |
| 5,127,104 | 6/1992 | Dennis | 395/650 |
| 5,187,796 | 2/1993 | Wang et al. | 395/800 |
| 5,274,812 | 12/1993 | Inoue | 395/700 |

Primary Examiner—Ken S. Kim
Attorney, Agent, or Firm—Richard A. Jordan

[57] ABSTRACT

A software compiler having a code generator and a scheduler. The code generator transforms a lowered intermediate representation (IR) of a source computer program, written in a known computer language, to an assembly language program written in a non-standard instruction set. In particular, the code generator translates vector instructions in the lowered IR to vector instructions from the non-standard instruction set. The vector instructions from the non-standard instruction set are defined such that assembly language programs written with them do not suffer from the effects of pipeline delays. Therefore, according to the present invention, the code generator eliminates the effects of pipeline delays when transforming the lowered IR to the assembly language program. Since the code generator eliminates the effects of pipeline delay, the scheduler's task is greatly simplified since the scheduler need only maximize the use of the functional units.

14 Claims, 6 Drawing Sheets

|  | | LOW LEVEL CODE | | | |
|---|---|---|---|---|---|
| | CYCLE | ISSUED | | RESULT | READY |
| | 1 | (SETUP) | | | |
| | 2 | | | | |
| FADDV V1 V2 V3 | 3 | FADD | V1(0) V2(0) | | |
| | 4 | FADD | V1(1) V2(1) | | |
| | 5 | FADD | V1(2) V2(2) | | V3(0) |
| | 6 | FADD | V1(3) V2(3) | | V3(1) |
| | 7 | FSTR | V3(0) $P_A+0$ | | V3(2) |
| FSTRV V3 PA | 8 | FSTR | V3(1) $P_A+1$ | | V3(3) |
| | 9 | FSTR | V3(2) $P_A+2$ | | |
| | 10 | FSTR | V3(3) $P_A+3$ | | |

COMPILING A SOURCE CODE VECTOR INSTRUCTION BY GENERATING A SUBGRID LOOP FOR ITERATAIVELY PROCESSING ARRAY ELEMENTS BY PLURAL PROCESSING ELEMENTS

This is a continuation of application Ser. No. 07/827,945, filed on Feb. 3, 1992 now abandoned.

CROSS-REFERENCE TO OTHER APPLICATIONS

The following applications are assigned to the assignee of the present application:

U.S. patent application Ser. No. 07/042,761, filed Apr. 27, 1987, by W. Daniel Hillis, entitled "Method and Apparatus for Simulating M-Dimensional Connection Networks in an N-Dimensional Network Where M is Less Than N", now issued U.S. Pat. No. 5,050,009, incorporated herein by reference.

U.S. patent application entitled "System and Method for Optimizing and Generating Computer-Based Code In a Parallel Processing Environment", Atty. Docket No. 1366.0010000, now issued U.S. Pat. No. 5,347,654, incorporated herein by reference.

U.S. patent application Ser. No. 07/829,480, filed Feb. 3, 1992, now abandoned and continued in Ser. No. 08/224,923, filed Apr. 11, 1994, entitled "System and Method for Mapping an Array to Processing Elements", Atty. Docket No. 1366.0030000, incorporated herein by reference.

U.S. patent application Ser. No. 08/172,391, filed Dec. 23, 1993, now abandoned, entitled "Parallel Vector Machine Model", Atty. Docket No. 1366.0120000, incorporated herein by reference.

INCORPORATION BY REFERENCE

U.S. Pat. No. 4,589,400, issued Jul. 1, 1986, to W. Daniel Hillis, for "Method and Apparatus for Routing Message Packets", and assigned to the assignee of the present application, incorporated herein by reference.

U.S. Pat. No. 4,984,235, issued Jan. 8, 1991, to Hillis et al., for "Method and Apparatus for Routing Message Packets and Recording the Routing Sequence", and assigned to the assignee of the present application, incorporated herein by reference.

BACKGROUND OF THE INVENTION

1. Field of the Invention

The present invention relates generally to software compilers, and more particularly to software compilers for compiling vector instructions.

2. Related Art

A compiler is a computer program that translates a source computer program written in a source computer language to a target computer program written in a target computer language.

In translating the source program to the target program, a compiler may be required to satisfy various requirements. For example, a compiler may be required to perform the translation within a specified amount of time.

Also, a compiler may be required to perform the translation such that the target computer program is one which will run effectively and efficiently on a particular target computer hardware. For example, suppose the target computer hardware is a computer having multiple pipelined functional units. For such computer hardware, typical requirements imposed on compilers include the following. First, the compiler must minimize the effects of pipeline delay. Second, the compiler must maximize the use of the functional units. These two compiler requirements are described below by way of an example.

Suppose a source program has the instructions shown below in Code Example 1.

| 1 | A=B+C |
| 2 | D=E+F |
|   | Code Example 1 |

Conventionally, a compiler's code generator would receive a representation of the source program containing the instructions in Code Example 1 and produce assembly language code (the code generator receives a "representation" since other components of the compiler may have performed initial compilation steps on the source program). For the instructions shown in Code Example 1, the code generator might generate the assembly language pseudocode shown in Code Example 2.

| 1  | XXX |
| 2  | Load $P_B$ R1 |
| 3  | Load $P_C$ R2 |
| 4  | Add R1 R2 R3 |
| 5  | STA R3 $P_A$ |
| 6  | LOAD $P_E$ R4 |
| 7  | LOAD $P_F$ R5 |
| 8  | ADD R4 R5 R6 |
| 9  | STA R6 $P_D$ |
| 10 | YYY |
|    | Code Example 2 |

In Code Example 2, note that the XXX at line 1 represents assembly language pseudocode which the code generator generated for instructions which appeared before line 1 in Code Example 1. Similarly, the YYY in line 10 of Code Example 2 represents assembly language pseudocode which the code generator generated for instructions occurring after the instruction at line 2 in Code Example 1.

The instructions at lines 2–5 in Code Example 2 correspond to the instruction at line 1 in Code Example 1. Specifically, the instructions in lines 2 and 3 in Code Example 2 load values from memory locations B and C into Registers R1 and R2, respectively. The instruction at line 4 in Code Example 2 adds the values in Registers R1 and R2 and places the result in Register R3. The instruction at line 5 in Code Example 2 stores the value in R3 to a memory location A.

The instructions at lines 6–8 in Code Example 2 correspond to the instruction at line 2 in Code Example 1. The operation of the instructions at lines 6–8 is analogous to the operation of the instructions at lines 2–5 in Code Example 2.

The first compiler requirement, minimizing the effects of pipeline delay, shall now be described with reference to Code Example 2.

The ADD instruction at line 4 in Code Example 2 uses the contents of R1 and R2. Therefore, for proper operation, R1 and R2 must be stable prior to the execution of the ADD instruction at line 4. The LOAD instructions at lines 2 and 3 load R1 and R2, respectively. These LOAD instructions require a finite amount of time to access and to transfer data from memory to registers. Therefore, it is possible that R1 and R2 will not be stable at the execution of the ADD instruction at line 4. If this occurs, the ADD instruction at line 4 will not produce correct results.

The store instruction at line 5 uses the contents of R3. Therefore, for proper operation, R3 must be stable before the store instruction at line 5 is executed. A pipeline delay is associated with the ADD instruction at line 4. That is, a finite amount of time passes between when the values in R1 and R2 are submitted to an arithmetic pipeline and when the pipeline returns the sum of the values in R1 and R2. Since the ADD instruction requires a finite amount of time to process, the value in R3 may not be stable before the store instruction at line 5 is executed. If this is the case, the store instruction at line 5 will not produce correct results.

As the previous two paragraphs describe, the pseudo assembly code generated by the code generator may not operate correctly due to pipeline delays.

The second requirement, maximizing the use of functional units, shall now be described with reference to Code Example 2.

A conventional computer having multiple pipelined functional units may include a memory access functional unit and an arithmetic/logic unit (ALU). Load instructions (such as those at lines 2 and 3) might be performed by the memory access unit. Arithmetic functions (such as the ADD instruction at line 4) might be performed by the ALU. Since multiple functional units exist, multiple instructions in Code Example 2 may be executed at the same time. This results in the maximal use of all the functional units. Note, however, that the pseudo assembly language code generated by the code generator in Code Example 2 has instructions being executed sequentially. Therefore, during any given time, only one functional unit is working. All other functional units are idle. Therefore, the assembly language pseudocode generated by the code generator does not maximize the use of all the functional units.

Conventionally, a compiler's scheduler modifies the assembly language code generated by the code generator in order to satisfy the two requirements described above. Specifically, the scheduler modifies the assembly language code generated by the code generator in order to minimize the effects of pipeline delay and maximize the use of functional units.

With regard to minimizing the effects of pipeline delays, the scheduler might modify the assembly language code shown in Code Example 2 to the assembly language code shown in Code Example 3.

| 1  | LOAD $P_B$ R1 |
| 2  | LOAD $P_C$ R2 |
| 3  | LOAD $P_E$ R4 |
| 4  | LOAD $P_F$ R5 |
| 5  | XXX |
| 6  | ADD R1 R2 R3 |
| 7  | ADD R4 R5 R6 |
| 8  | YYY |
| 9  | STA R3 $P_A$ |
| 10 | STA R6 $P_D$ |
|    | Code Example 3 |

In Code Example 3, the scheduler has moved the LOAD statements above the instruction XXX. This insures that the values in registers R1, R2, R4 and R5 are stable before the execution of the ADD instructions at lines 6 and 7. Also, the code generator has moved the store instructions below the YYY instructions. This insures that the values in R3 and R6 are stable before they are used before the store instructions in lines 9 and 10.

Alternatively, with regard to maximizing the use of the functional units, the scheduler might modify the assembly language code shown in Code Example 2 to the assembly language code shown in Code Example 4.

| 1 | XXX |
| 2 | LOAD $P_B$ R1 |
| 3 | LOAD $P_C$ R2 |
| 4 | LOAD $P_E$ R4 |
| 5 | ADD R1 R2 R3; LOAD $P_F$ R5 |
| 6 | STA R3 $P_A$; ADD R4 R5 R6 |
| 7 | STA R6 $P_D$ |
| 8 | YYY |
|   | Code Example 4 |

In line 5 of Code Example 4, the scheduler is causing an ADD instruction and a load instruction to execute at the same time. This is possible since the ADD instruction and the load instruction do not depend upon one another and because the ADD instruction and the load instruction are executed by different functional units (that is, the ADD instruction is performed by the ALU and the load instruction is performed by the memory access unit). Similarly, the scheduler at line 6 is causing a store instruction and an ADD instruction to execute at the same time.

As noted above, in conventional compilers, the scheduler is responsible for both minimizing the effects of pipeline delay and maximizing the use of functional units. Note, however, that the assembly language code in Code Example 3 minimizes the effects of pipeline delay but does not maximize the use of functional units. Also, the assembly language code in Code Example 4 maximizes the use of functional units but does not minimize the effects of pipeline delay. Therefore, in order to both minimize the effects of pipeline delay and maximize the use of functional units, the scheduler must produce assembly language code which is a combination of that shown in Code Examples 3 and 4.

However, the task of simultaneously minimizing the effects of pipeline delay and maximizing the use of functional units is very difficult. Generally, achieving optimal solutions is, at best, computational expensive, or at worst, theoretically impossible. As a result, the requirements of minimizing the effects of pipeline delays and maximizing the use of functional units are not adequately satisfied.

In summary, conventional compilers which require schedulers to both minimize the effects of pipeline delay and maximize the use of functional units are flawed because such compilers do not adequately satisfy either of these two requirements.

SUMMARY OF THE INVENTION

The present invention is directed to a software compiler having a code generator and a scheduler. The code generator transforms a lowered intermediate representation (IR) of a source computer program, written in a known computer language, to an assembly language program written in a non-standard instruction set. In particular, the code generator translates vector instructions in the lowered IR to vector instructions from the non-standard instruction set. The vector instructions from the non-standard instruction set are defined such that assembly language programs written with them do not suffer from the effects of pipeline delays. Therefore, according to the present invention, the code generator eliminates the effects of pipeline delays when transforming the lowered IR to the assembly language program. Since the code generator eliminates the effects of pipeline delay, the scheduler's task is greatly simplified since the scheduler need only maximize the use of the functional units.

The manner in which the code generator translates vector instructions in the lowered IR to vector instructions from the non-standard instruction set is as follows.

First, for a processing element (PE) code block in the lowered IR, the code generator emits, to an assembly language program, instructions for creating a subgrid loop for the PE code block. Second, the code generator transforms the vector instructions in the PE code block to the vector instructions from the non-standard instruction set, wherein each of these vector instructions from the non-standard instruction set operates on multiple array elements. Third, the code generator emits these vector instructions from the non-standard instruction set to the assembly language program inside the subgrid loop.

The manner in which the code generator creates the subgrid loop is as follows. First, the code generator determines an array size of arrays in the PE code block. Second, the code generator calculates a subgrid size by dividing the array size by X, which equals the number of array elements which each vector instruction operates on. Third, the code generator emits instructions to the assembly language program for generating a loop (that is, the subgrid loop) having a number of iterations equalling the subgrid size.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview of the Present Invention

The present invention is directed to a software compiler having a code generator and a scheduler. The code generator transforms a lowered intermediate representation (IR) of a source computer program, written in a known computer language, to an assembly language program written in a non-standard instruction set. The source program includes vector instructions from the known computer language. The assembly language program, once fully compiled, is intended to operate on a data parallel computer having multiple processing elements (PE). Each of the PEs includes multiple pipeline functional units.

According to the present invention, the code generator translates vector instructions in the lowered IR to vector instructions from the non-standard instruction set. These vector instructions from the non-standard instruction set comprise portions of the assembly language program. The vector instructions from the non-standard instruction set are defined such that assembly language programs written with them do not suffer from the effects of pipeline delays. Therefore, according to the present invention, the code generator eliminates the effects of pipeline delays when transforming the lowered IR to the assembly language program. Since the code generator eliminates the effects of pipeline delay, the scheduler's task is greatly simplified since the scheduler need only maximize the use of the functional units.

Because the requirements of minimizing the effects of pipeline delay and maximizing the use of functional units are distributed among the code generator and the scheduler, the compiler of the present invention adequately satisfies both these requirements.

The compiler of the present invention is described in detail in the following sections.

2. Data Parallel Computer

As noted above, the present invention is directed to a software compiler 112 having a code generator and a scheduler. The code generator transforms a lowered IR of a source program, written in a known computer language, to an assembly language program written in a non-standard instruction set. The assembly language program, once fully compiled, is adapted for use with a data parallel computer.

Figure 1:
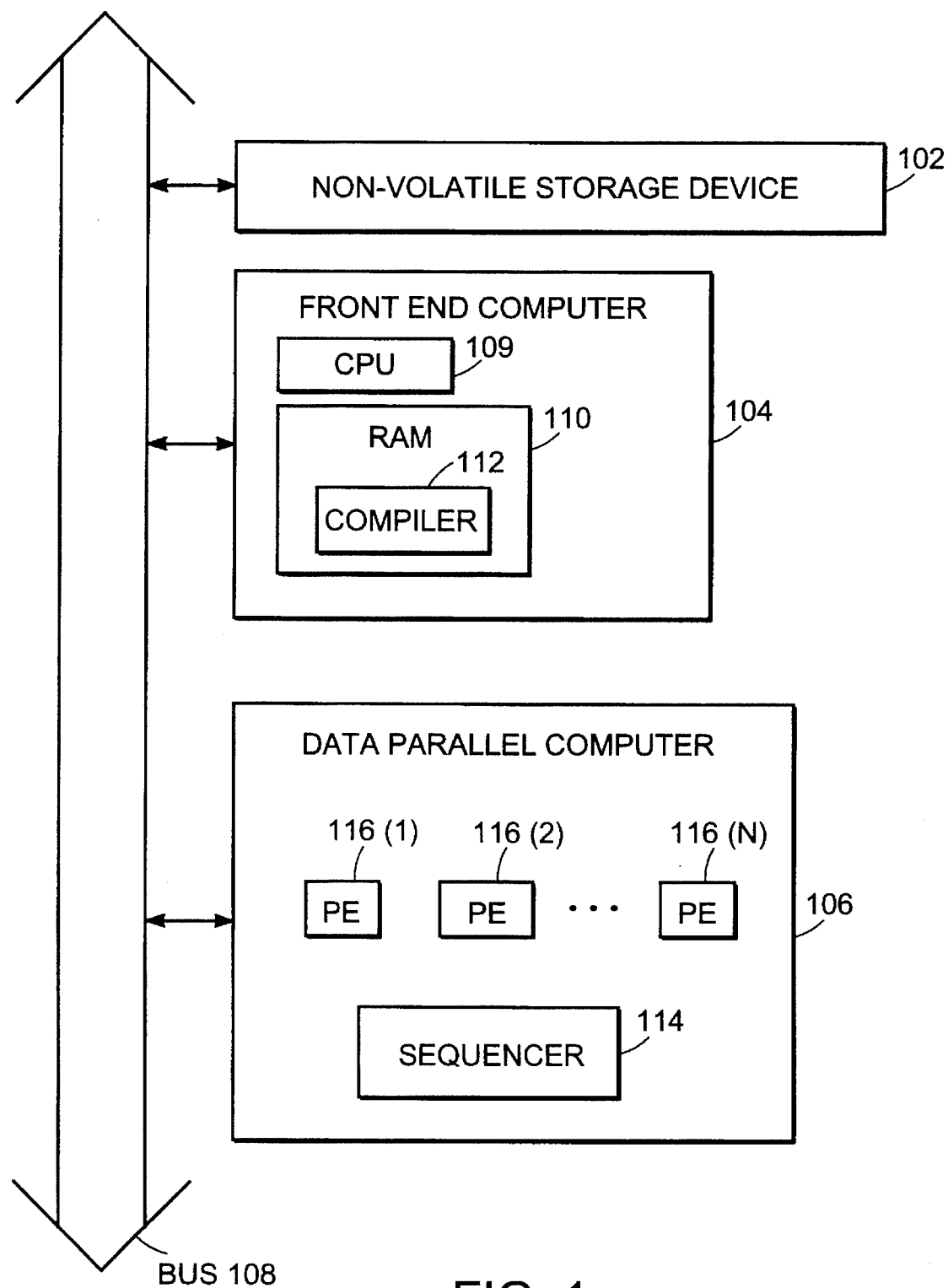
FIG. 1 shows a block diagram of a data parallel computer.

FIG. 1 shows a block diagram of a data parallel computer 106. The data parallel computer 106 includes a plurality of processing elements (PEs) 116. The data parallel computer 106 also includes a sequencer 114. The number of PEs 116 in an actual data parallel computer 106 might range from 2,048 to 65,536.

The data parallel computer 106 is electrically connected to a front end computer 104 and to a non-volatile storage device 102 via a bus 108.

The front end computer 104 is a serial computer such as a Sun 4 (manufactured by Sun Microsystems, Inc.) or a VAX (manufactured by Digital Equipment Corp.). The front end computer 104 comprises a single host CPU (or a small number of CPUs) 109 and a RAM 112. Note that the compiler 112 of the present invention may be stored in the RAM 110.

The data parallel computer 106 may be one manufactured by Thinking Machines Corporation, such as the Connection Machine® Model CM1™, CM2™ and CM5™ Supercomputers. These are described in U.S. Pat. No. 4,589,400 to Hillis, U.S. Pat. No. 4,984,235 to Hillis et al., and U.S. patent application Ser. No. 07/042,761, entitled "Method and Apparatus for Simulating M-Dimensional Connection Networks in an N-Dimensional Network Where M is Less Than N", filed Apr. 27, 1987, by Hillis, all of which were cited above.

Specifically, U.S. Pat. No. 4,589,400 describes a massively-parallel computer, including processors and a router, with which the present invention can be used. U.S. Pat. No. 4,984,235 describes a massively-parallel computer, including a second type of processors. U.S. patent application Ser. No. 07/042,761, entitled "Method and Apparatus for Simulating M-Dimensional Connection Networks in an N-Dimensional Network Where M is Less Than N", describes, in a massively parallel computer including processor chips interconnected by a hypercube, an arrangement for emulating 2-, 3-, or higher dimensional nearest-neighbor communication network ("NEWS") between chips using the hypercube wires.

Figure 3:
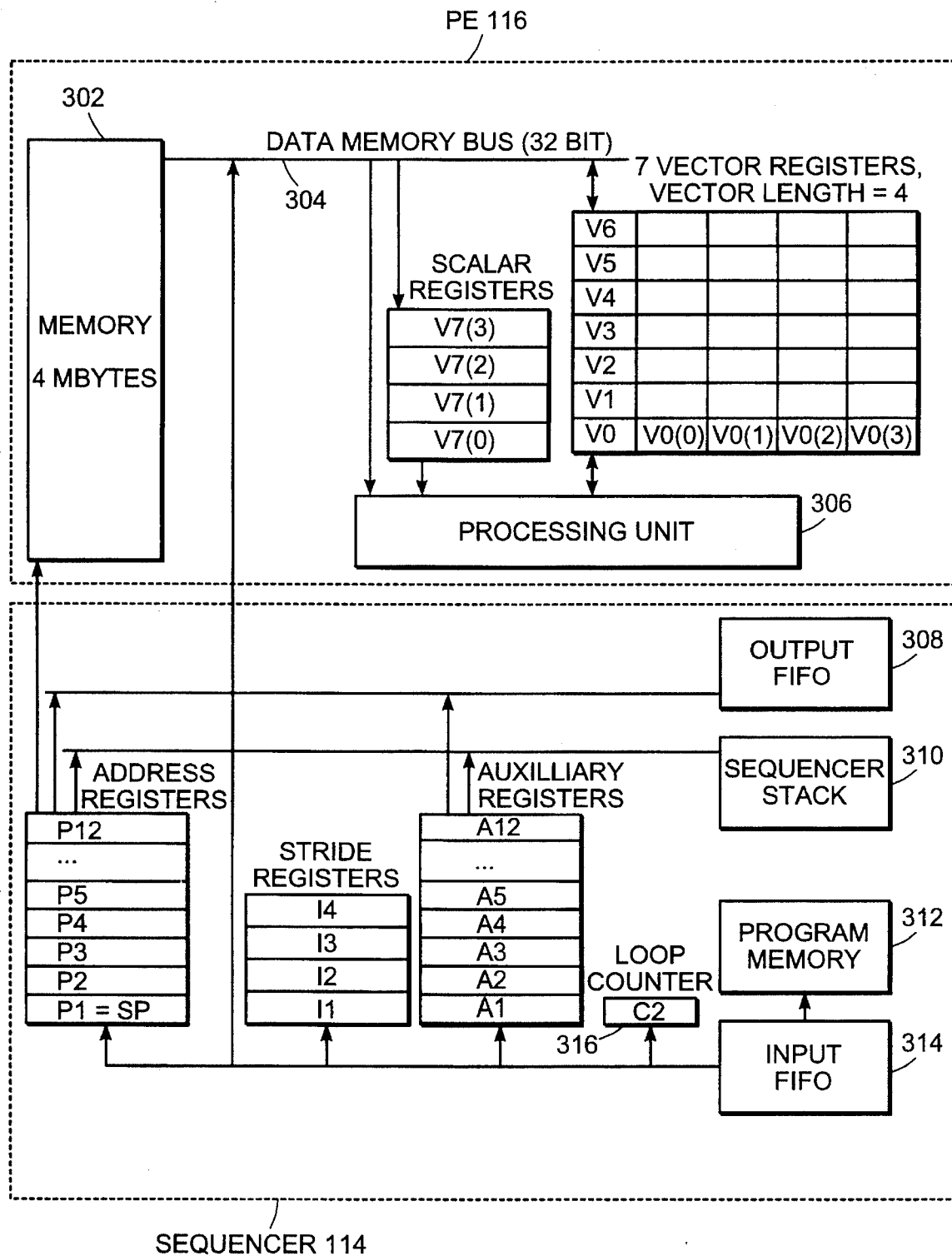
FIG. 3 illustrates the structure of a sequencer and a processing element.

FIG. 3 illustrates the structure of the sequencer 114 and each of the processing elements 116. For clarity purposes, FIG. 3 illustrates only one of the processing elements 116.

Each of the processing elements 116 includes a memory 302, a data memory bus 304, and a processing unit 306. In a preferred embodiment of the present invention, the memory 302 includes 4 megabytes of random access memory and the data memory bus 304 is 32 bits wide.

The processing unit 306 includes multiple pipelined functional units. For example, the processing unit 306 may include multiple memory access units and multiple arithmetic logic units (ALUs). The processing unit 306 does not include specialized vector hardware. Rather, the processing unit 306 includes only well known pipeline floating point units.

Each of the processing elements 116 also includes 7 vector registers V0–V6. Each of the vector registers V0–V6 correspond to groups of four 64-bit registers (such as well known Weitek registers) which are ordinarily loaded with adjacent vector elements. For example, vector register V0 includes registers R0–R3. Vector register V1 includes registers R4–R7. Individual registers are referenced by using a "(x)" suffix. For example, the four registers corresponding to vector register V0 are referenced using the following designations: V0(0), V0(1), V0(2), and V0(3).

Each of the PEs 116 also includes four 64-bit scalar registers V7(0)–V7(3). Note that each of the four scalar registers and the 28 individual registers comprising the 7 vector registers are physically identical.

The sequencer 114 includes an output first in first out (FIFO) buffer 308, a sequencer stack 310, a program memory 312, and input FIFO 314, and a loop counter 316.

The sequencer 114 also includes address registers P1–P12. These are sequencer registers used to hold the addresses of locations in the memory 302.

The address register P1 is reserved for a stack pointer (SP). The stack pointer holds the address of a pointer to the stack in the memory 302. The stack pointer is set from a value passed down the input FIFO 314 from the front end computer 104. The stack pointer is incremented before the subgrid loop to allocate space for temporary storage used by the compiler code for spill locations. The stack pointer is not changed during the execution of the subgrid loop nor does it need to be reset when control leaves the subgrid loop. Subgrid loops are described further in sections below.

The sequencer 114 also includes auxiliary registers A1–A12. The auxiliary register A12 is used as a linkage register for calling PE routines. The other auxiliary registers are used as spill locations for the address registers.

The sequencer 114 also includes increment registers (also called stride registers) I1–I4. The increment registers are loaded with constant values and are used as offsets and strides for memory address specifiers for various program data types.

3. Structural and Operational Overview of the Compiler of the Present Invention

As illustrated in FIG. 1, the compiler 112 of the present invention may reside in the RAM 110 of the front end computer 104. According to this scenario, the compiler 112 would execute on the front end computer 104. Alternatively, the compiler 112 may execute on another computer which is not electrically connected to the data parallel computer 106.

Figure 2:
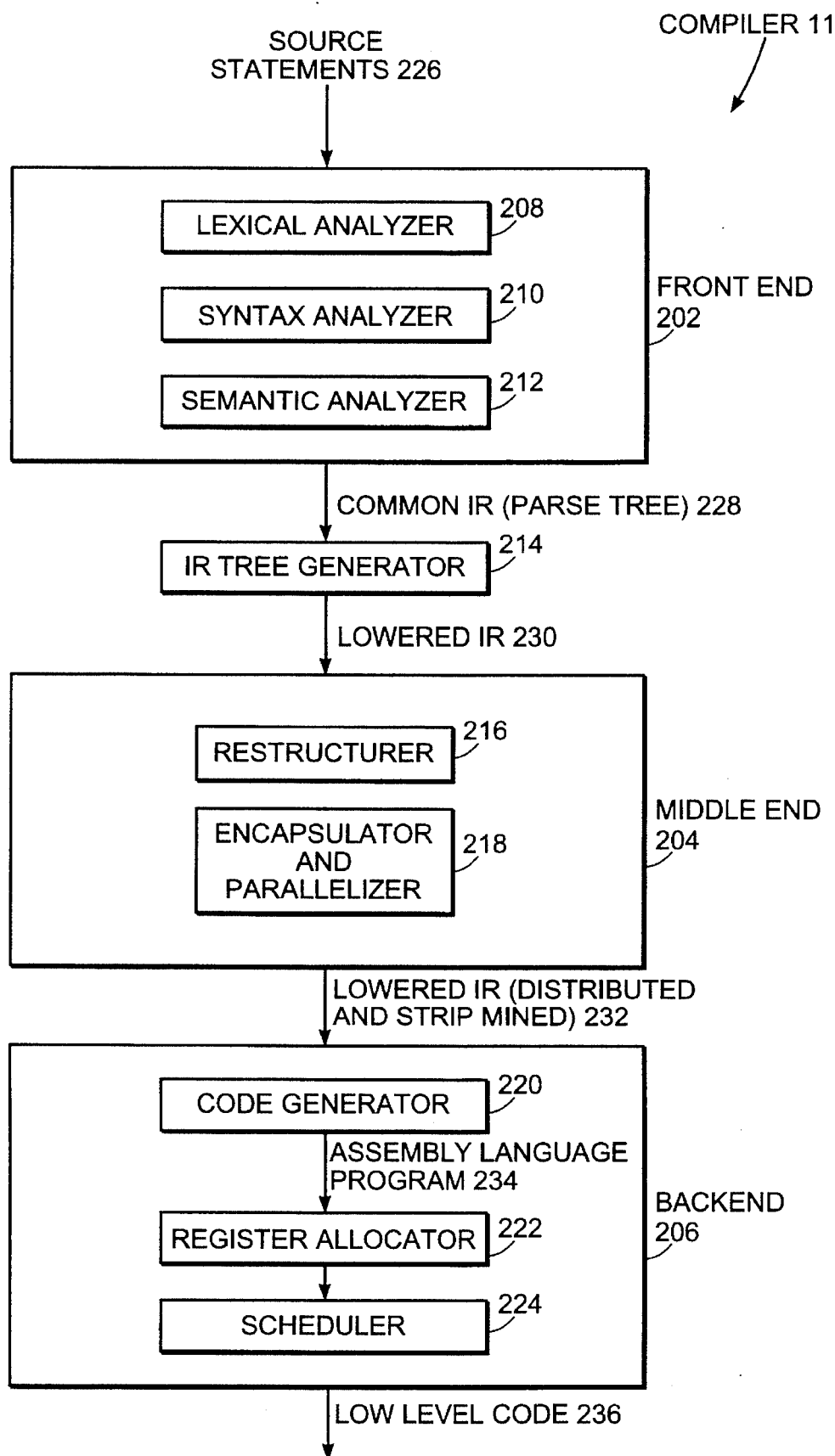
FIG. 2 illustrates a block diagram of a compiler of the present invention.

FIG. 2 illustrates a block diagram of the compiler 112 of the present invention. FIG. 2 also illustrates the sequential stages of processing performed by the compiler 112.

Referring now to FIG. 2, one or more source statements 226 in a source program are received by a front end 202 which contains a lexical analyzer 208, a syntax analyzer 210, and a semantic analyzer 212. In a preferred embodiment of the present invention, the source program is written in CM Fortran, which is essentially Fortran 77 combined with the array features of the ISO Fortran 90 Standard. Fortran 77 and the ISO Fortran 90 Standard are both well known. CM Fortran is described in *CM Fortran Reference Manual* (Version 1.0, 1991), which is herein incorporated by reference in its entirety.

The lexical analyzer 208 reads in each of the characters of each source statement and groups each token of the source statement (i.e., each variable, function, mathematical operation) into a stream of internal tokens representative of a key word of the programming language or a variable in the source statement. The syntax analyzer 210 parses the statement into a high level parse tree by grouping the tokens of the statement into a hierarchical tree so that they become nodes when the mathematical operators (or functions) of the statement are the parent nodes for each token. The mathematical operators themselves are the children of other nodes. The semantic analyzer 212 checks the parse tree for semantic errors, and performs such functions as data type checking. The result is what is hereafter referred to as a common internal representation (IR) 228.

The common IR 228 is received by an IR tree generator 214. The IR tree generator 214 converts the common IR 228 into a form which is lowered (that is, it reflects the semantics rather than the syntax), and thus a lowered IR tree 230 is formed. The IR tree generator 214 takes into account various needs and idiosyncrasies of the target computer system and makes changes to the common IR 228 accordingly.

The lowered IR 230 is then received by what is conventionally known as the middle end 204. The middle end 204 produces further lowered IR 232. In FIG. 2, the middle end 208 is shown to include a restructurer 216 and an encapsulator and parallelizer 218. In producing the lowered IR 232, the middle end 204 performs a number of functions.

First, the middle end 204 identifies elemental nodes and non-elemental nodes in the lowered IR 230. Non-elemental nodes are nodes which invoke communication between PEs 116. Elemental nodes are nodes which do not invoke communication between PEs 116.

After identifying the elemental and non-elemental nodes in the lowered IR 230, the middle end 204 encapsulates the elemental nodes into one or more processing element (PE) code blocks. APE code block is defined as follows. First, a PE code block contains only elemental nodes. Second, all arrays in a PE code block have the same size and layout. Finally, PE code blocks contain only nodes which are inline (that is, having no loops).

The middle end 204 performs this encapsulation by repositioning non-elemental nodes "above" the elemental nodes. Then, the middle end 204 searches for maximal blocks of continuous elemental statements within the restructured LIR statements. It then encapsulates these maximal continuous blocks by associating the block with a block identifier, which in some respects transforms this block into a single LIR statement. The blocks of continuous elemental statements are then modified so that the appropriate low level scalar and parallel code can be generated. The manner in which the middle end 204 performs this encapsulation is further described in the pending patent application entitled "System And Method For Optimizing And Generating Computer-Based Code In A Parallel Processing Environment" (Atty. Docket No. 1366.0010000), which was cited above.

In addition to performing this encapsulation, the middle end 204 emits instructions into the lowered IR 232 in order to evenly distribute data among the PEs 116. For example, suppose the lowered IR 230 contained the following array: A(9,9). Also assume that the data parallel computer 106 contained 9 PEs 116.

Figure 4:
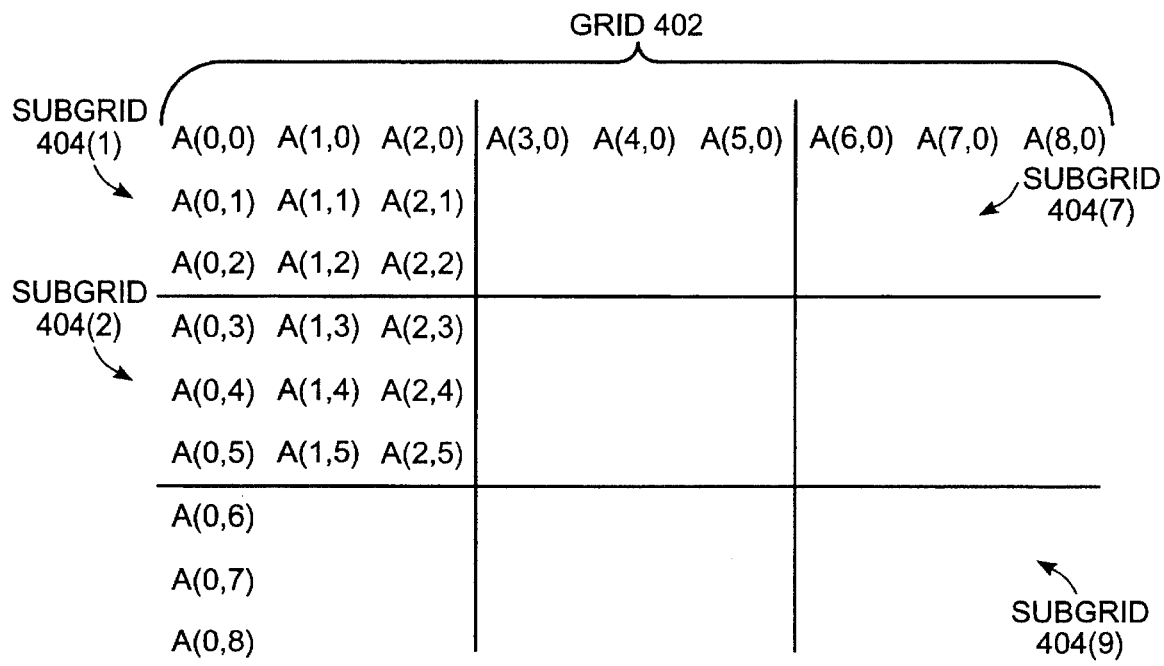
FIG. 4 illustrates a technique for distributing elements of arrays among processing elements.
Figure 4:
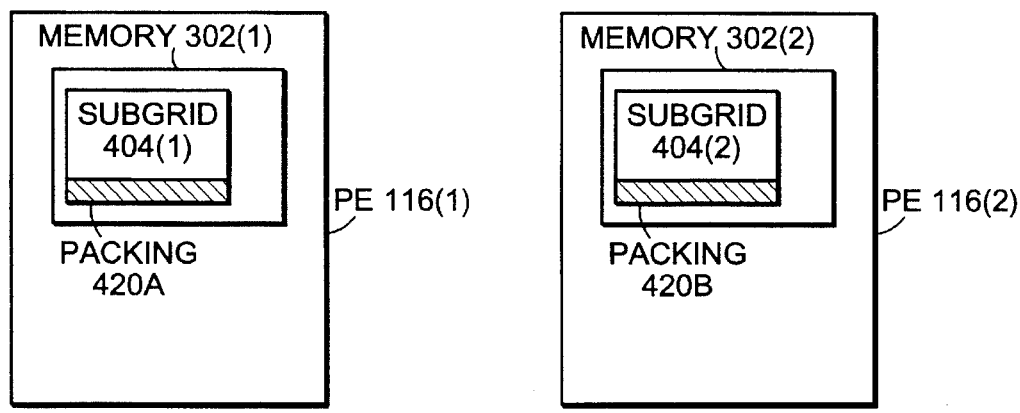

According to the present invention, the middle end 204 would emit instructions into the lowered IR 232 in order to evenly distribute the elements of the array A among the nine PEs 116 such that each of the PEs 116 stored 9 elements of the array A. The present invention contemplates different procedures for distributing the elements of A among the nine PEs 116. One such procedure is illustrated in FIG. 4. FIG. 4 graphically illustrates in a Grid 402 the elements of array A. The Grid 402 is segmented into nine subgrids 404. Each of the subgrids 404 contains 9 elements of array A. Each of the subgrids 404 is distributed to one of the processing elements 116. For example, subgrid 404(1) is assigned to PE 116(1). Also, subgrid 404(2) is distributed to PE 116(2).

The Grid 402 could have been segmented in many other ways. For example, the Grid 402 could have been segmented so that the elements of array A having indexes with the same value (such as A(0,0), A(0,1), . . . A(0,8)) would be in the same subgrid.

According to the present invention, the middle end 204 fills the subgrids 404 with packing 420 such that the number of elements in each subgrid is a multiple of N. In a preferred embodiment of the present invention, N=4.

The manner in which data is distributed among PEs 116 is further described in the pending patent application entitled "System and Method for Mapping Array Elements to Processing Elements" (Atty. Docket No. 1366.0030000), which was cited above.

In addition to performing the encapsulation and data distribution functions described above, the middle end 204 strip mines the data. In other words, the middle end 204 insures that the data has been distributed among the PEs 116 in a manner which allows vector operations to operate on multiple elements of arrays. The middle end 204 uses well known algorithms to perform the data strip mining function.

Once the lowered IR 230 has been encapsulated, data distributed, and strip mined, then a back end 206 is used to generate low level code 236. As noted above, the code generator 220 transforms the lowered IR 232 to an assembly language program 234 which is written in a non-standard instruction set. In performing this transformation, the code generator 220 eliminates the effects of pipeline delays.

According to the present invention, the assembly language program 234 generated by a code generator 220 includes references to virtual registers. A register allocator 222 assigns real registers to the virtual registers in the assembly language program 234. A scheduler 224 then uses conventional techniques to maximize the use of functional units. Note that since the scheduler 224 is not responsible for minimizing the effects of pipeline delay, the scheduler 224 can satisfactorily meet the requirement of maximizing the use of functional units.

The low level code 236 may be received by an assembler (not shown in FIG. 2). The assembler would generate machine code for operation on a particular computer from the low level code 236.

Aspects of the compiler 112, particularly the Lexical Analyzer 208, Syntax Analyzer 210, Semantic Analyzer 212 and IR tree generator 214, are further described in Aho et al., *Compilers—Principles, Techniques, and Tools*, (March 1988 edition), which is herein incorporated by reference in its entirety.

4. Non-Standard Instruction Set

As noted above, the code generator 220 of the present invention transforms the lowered IR 232 of a computer program, written in a known computer language, to the assembly language program 234 written in a non-standard instruction set. The non-standard instruction set includes the characteristics described in this section.

The non-standard instruction set is a relatively low-level, virtual register transfer language. The non-standard instruction set comprises vector instructions and scalar instructions. Vector instructions in conventional low-level, register transfer languages operate on single vector elements. According to the present invention, however, the vector instructions of the non-standard instruction set operate on sequences of multiple vector elements. Referring to FIG. 3, a sequence of vector elements comprising a vector are stored in sequential registers comprising one of the vector registers V0–V6. Because the vector instructions operate on sequences of vector elements, assembly language programs written with the vector instructions of the non-standard instruction set do not suffer from the effects of pipeline delays. This is further described below.

The number of vector elements operated upon by each vector instruction is implementation dependent. Design considerations involved in selecting this number (that is, tile number of vector elements operated upon by each of the vector instructions) are described below in Section 6. According to the preferred embodiment of tile present invention, the vector instructions of the non-standard instruction set each operate on sequences of four vector elements.

The non-standard instruction set shall be further described by considering three vector instructions from the non-standard instruction set. These three vector instructions are flodv, faddv, and fstrv. These vector instructions are described below.

The syntax of flodv is shown below.

| flodv | V_addr V_reg |
|---|---|

Code Example 5

Flodv loads into the vector register V_reg a vector of four floating point values whose vector address is V_addr. For example, consider the following flodv instruction.

flodv $P_A$ V0

Code Example 6

Referring to FIG. 4, assume that the instruction in Code Example 6 is processed by PE 116(1). Also assume that the address $P_A$ points to the top of the subgrid 404(1) which is stored in the memory 302(1) of the PE 116(1). Assuming that the elements of subgrid 404(1) are stored in memory 302 in the following order: A(0,0), A(0,1), A(0,2), A(1,0) . . . A(2,2), then the instruction shown in Code Example 6 would load the value A(0,0) into register V0(0). Also, the instruction in Code Example 6 would load the values A(0,1), A(0,2), and A(1,0) into the registers V0(1), V0(2) and V0(3), respectively.

The syntax of faddv is as follows.

faddv V_op_n V_op_m V_reg_r

Code Example 6

Faddv adds a vector of four floating point numbers in the vector register v_op_n to a vector of four floating point numbers in the vector register V_op_m. The resulting vector of four floating point numbers is stored into vector register v_reg_r. For example, consider the faddv instruction shown in Code Example 7.

```
faddv V0 V1 V2
```

Code Example 7

The faddv instruction shown in Code Example 7 is equivalent to the following.

| V2(0) = | V0(0) + V1(0) |
| V2(1) = | V0(1) + V1(1) |
| V2(2) = | V0(2) + V1(2) |
| V2(3) = | V0(3) + V1(3) |

The syntax of the fstrv instruction is shown below.

```
fstrv V_reg V_addr
```

Code Example 9

The fstrv instruction stores a vector of four floating point numbers from the vector register V_reg into the memory location designated by V_addr. For example, consider the fstrv instruction shown below.

```
fstrv V2 P_A
```

Code Example 10

The fstrv instruction shown in Code Example 10 would store the contents of vector register V2 into the memory location PA. In other words, the fstrv instruction shown in Code Example 10 would store V2(0), V2(1), V2(2), and V2(3) into the memory space pointed to by address 5. Code Generator As described above in Section 3, the code generator 220 receives strip mined lowered IR 232 which contains PE code blocks. The lowered IR 232 also contains communication instructions which cause elements to be evenly distributed among the PEs 116.

The code generator 220 transforms the lowered IR 232 into the assembly language program 234. The assembly language program 234 contains instructions from the non-standard instruction set described above in Section 4. In particular, the code generator 220 transforms vector instructions contained in the lowered IR 232 to vector instructions from the non-standard instruction set. As described in Section 4, the vector instructions from the non-standard instruction set operate on multiple array elements. In the preferred embodiment, the vector instructions from the non-standard instruction set operate on four array elements.

The code generator 220 operates on a per-PE code block basis. That is, the code generator 220 transforms each PIE code block independently from the transformation of all other PE code blocks. The code generator 220 is able to do this because by definition, each PE code block is independent from all other PE code blocks.

Figure 5:
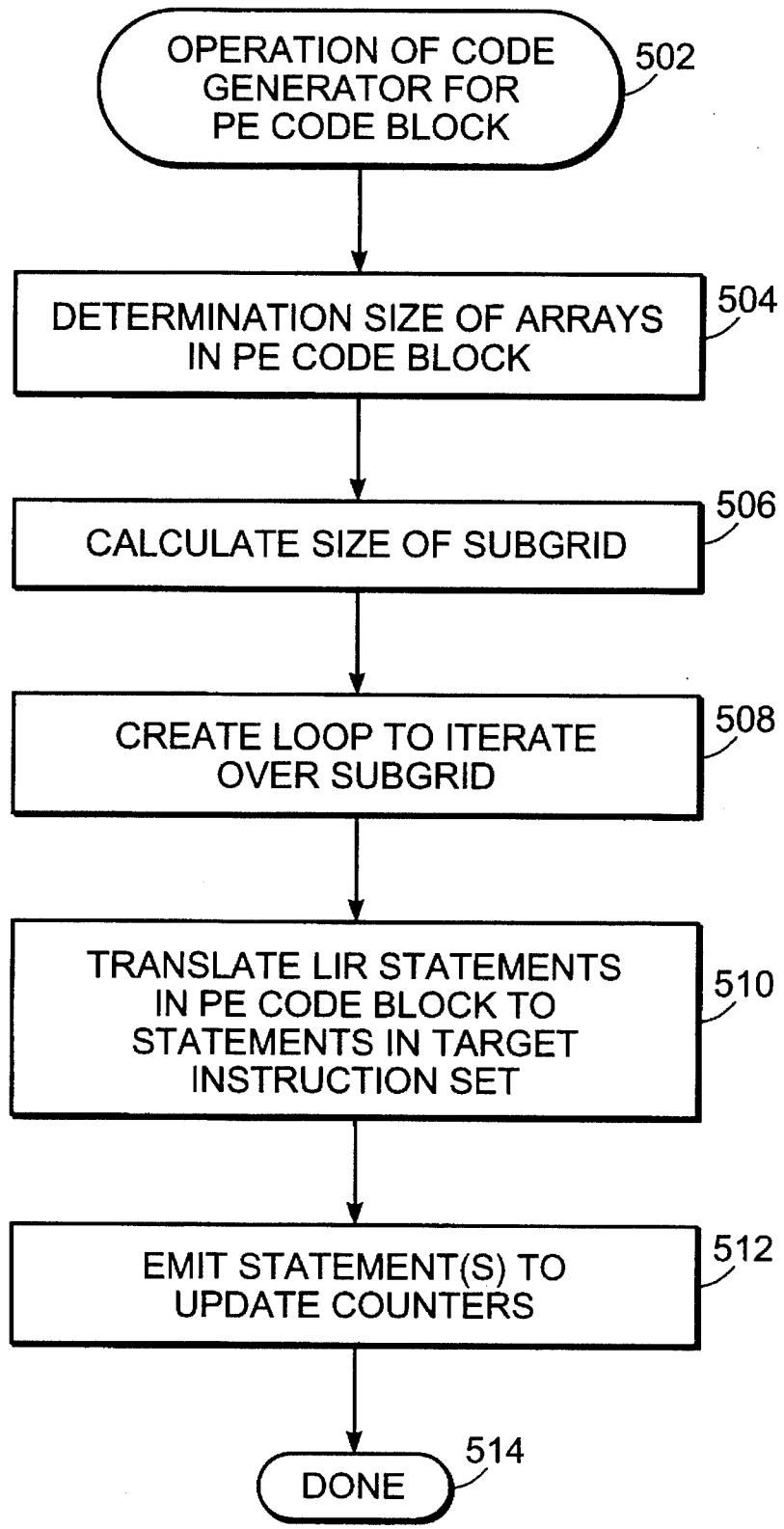
FIG. 5 presents a flowchart which illustrates the operation of a code generator of the present invention.

FIG. 5 presents a flowchart 502 which illustrates the operation of the code generator 220 for each PIE code block. In other words, the code generator 220 executes each of the steps shown in FIG. 5 for each PE code block in the lowered IR 232.

The flow chart 502 shall be described with reference to an example. For this example, assume that the code generator 220 is transforming a PE code block which contains the Fortran vector instructions shown below in Code Example 11.

| 1 | Real A (1024,1024) |
| 2 | Real B (1024,1024) |
| 3 | Real C (1024,1024) |
| 4 | A = B + C |
| 5 | D = E * F |
| | Code Example 11 |

Also for this example, assume that the data parallel computer 106 contains 1024 PEs 116. The flow chart 502 shall now be described.

In a step 504, the code generator 220 determines the size of the arrays in the PE code block. With regard to the current example, the PE code block contains arrays A, B, and C. The size of these arrays is 1024×1024. Therefore, during step 504 the code generator 220 would determine that the total size of the arrays referenced in the PE code block is 1024×1024.

In an embodiment of the present invention, the front end computer 104 would push this information (that is, the size of the arrays in the PE code block) into the input FIFO 314. The code generator 220 would then perform step 504 by popping the size of the arrays for the current PE code block from the input FIFO 314.

Note that the size of the arrays determined by the code generator 220 in step 504 includes any packing 420 created by the middle end 204.

In a step 506, the code generator 220 calculates the size of the subgrids. As described above in Section 3, the subgrids each contain the same number of array elements and are distributed to the PEs 116. In the current example, since the size of the arrays A, B, and C is 1024×1024, and since there are 1024 PEs 116, each of the PEs 116 receives 1024 elements from each of the arrays A, B and C. In other words, the size of the subgrid is 1024.

In a step 508, the code generator 220 emits statements to the assembly language program 234 in order to create a loop to iterate over the subgrid. As noted above, each of the vector instructions from the non-standard instruction set operates on four array elements. Therefore, in order to process the entire subgrid, the code generator 220 must create a loop having (size of subgrid÷4) iterations. In the current Example, the size of the subgrid (as determined in step 506) is 1024. Therefore, in step 508, the code generator 220 creates a loop having 1024÷4=256 iterations. This loop is called a subgrid loop.

In steps 510 and 512, the code generator 220 emits statements to the assembly language program 234. These statements are inserted inside the subgrid loop which the code generator 220 created in step 508.

In a step 510, the code generator 220 transforms the vector instructions from the lowered IR 232 into vector instructions from the non-standard instruction set. These vector instructions from the non-standard instruction set are emitted to the assembly language program 234 and placed inside the subgrid loop.

In a step 512, the code generator 220 emits statements to the assembly language program 234 to update any address registers P1–P12 which reference array elements in the memory 302.

Code Example 12, below, illustrates a portion of the assembly language program 234 which corresponds to the PE code block shown in Code Example 11.

```
1       <Loop 1024/4>
2          FLODV P_B V1
3          FLODV P_C V2
4          FADDV V1 V2 V3
5          FSTRV V3 P_A
6          FLODV P_E V4
7          FLODV P_F V5
8          FMULV V4 V5 V6
9          FSTRV V6 P_D
10         <Increment P registers by 4>
11      <END OF LOOP>
         Code Example 12
```

The pseudo instructions shown in lines 1 and 11 of Code Example 12 represent the subgrid loop which the code generator 220 generated in step 508.

The instructions in lines 2–5 of Code Example 12 represent the vector add instruction in line 4 of Code Example 11. Referring to Code Example 12, the instruction at line 2 loads the value at memory location B into vector register V1. The instruction at line 3 loads the value at memory location C into vector register V2. The instruction at line 4 adds the values from vector instructions V1 and V2 and stores the result in vector register V3. The instruction at line 5 stores the value from vector register V3 into memory location A.

The instructions at lines 6–9 of Code Example 12 correspond to the vector multiply instruction at line 5 in Code Example 11. The operation of the instructions at lines 6–9 of Code Example 12 is analogous to the operation of the instructions at lines 2–5.

The operation of the vector instructions from the non-standard instruction set shown in Code Example 12 were described above in Section 4. This operation is further described below with reference to FIG. 6 which shows a timing diagram for the vector instructions at lines 4 and 5 in Code Example 12.

Figures 6, 7:
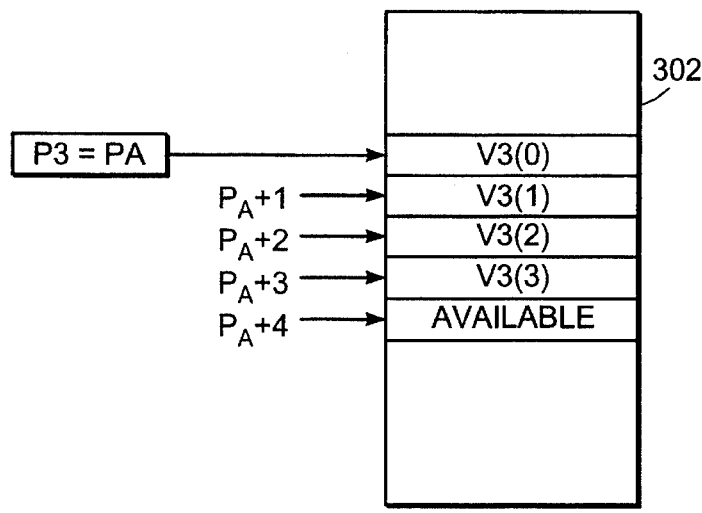
FIG. 6 shows a timing diagram for vector instructions.
FIG. 7 illustrates a technique for storing values in memory.

As illustrated in FIG. 6, the faddv instruction requires six cycles and the fstrv instruction requires four cycles (depending on the particular implementation, the fstrv instruction may require additional cycles for setup and memory storage latency). The first two cycles of the faddv instruction are required for setup purposes. During these two cycles, the processing unit 306 is informed that vector add operations will be performed.

In cycle 3, the first elements in vector registers V1 and V2 are added. Specifically, the values in registers V1(0) and V2(0) are added.

Similarly, in cycles 4, 5, and 6, the second, third and fourth elements of vector registers V1 and V2 are added. The results of the additions in cycles 3–6 are stored in vector register V3. Specifically, the sum of the addition of the first elements of V1 and V2 is stored in the first element of vector register V3 (that is, register V3(0)). Similarly, the sums of the additions of the second, third and fourth elements of vector registers V1 and V2 are stored in the second, third and fourth elements of vector register V3, respectively.

The fstrv instruction starts at cycle 7. In cycle 7, the value in register V3(0) is stored in a memory location $P_A$ with an offset of zero. The address of memory location $P_A$ may be stored in one of the address registers P1–P12. For this example, assume that the address register P3 stores the address of memory location $P_A$.

In cycle 8, the value in register V3(1) is stored in a memory location having an address $P_A+1$. Similarly, in cycles 9–10, the values in registers V3(2) and V3(3) are stored in memory locations with addresses $P_A+2$ and $P_A+3$, respectively. This storing of the values of vector register V3 in memory 302 is illustrated in FIG. 7. Note that the address register P3 contains the address of memory location $P_A$, and the first element of vector register V3 is stored in this memory location. The other elements of vector register V3 are stored in consecutive locations in memory 302. The memory location with address $P_A+4$ represents the next available location in the memory 302.

Referring again to FIG. 6, note that due to pipeline delays in the processing unit 306, the sum of the fadd at cycle 3 is not available until cycle 5. This is indicated by the "Results Ready" column in FIG. 6. Similarly, the sums of the add at cycles 4, 5, and 6 are not available until cycles 6, 7, and 8, respectively. Therefore, when the fstrv instruction starts at cycle 7, the results of the adds of cycles 5 and 6 are not yet available.

However, as evident by the timing chart in FIG. 6, this pipeline delay does not cause incorrect operation since the fstrv instruction does not use these values until cycles 9 and 10, respectively. When the fstrv instruction starts at cycle 7, the required value (that is, the value in register V3(0)) is available. Also, at cycle 8, the required value (that is, the value in register V3(1)) is available. Therefore, because the code generator 220 uses vector instructions which operate on multiple array elements, the code generator 220 eliminates the effects of pipeline delays.

Referring again to Code Example 12, the instruction at line 10 increments the address registers P1–P12 to prepare for the next iteration. For example, referring to FIG. 7, the address register P3 would be updated with the value $P_A+4$ in order to point to the next available location in memory 302.

Note that the pseudo instructions in Code Example 12 (indicated by the "<" and the ">") may be implemented using appropriate instructions from any conventional register transfer instruction set.

6. Design Considerations

As noted above, the code generator 220 transforms vector instructions from the lowered IR 232 into vector instructions from the non-standard instruction set. The vector instructions from the non-standard instruction set operate on multiple array elements at a time. For reference purposes, the number of array elements which the vector instructions operate on shall be denoted by X. As noted above, in the preferred embodiment of the present invention, X=4. However, the present invention may operate with vector instructions where X does not equal 4.

In determining a proper value of X, it is necessary to satisfy a number of requirements and constraints. First, X must be large enough to eliminate the effects of pipeline delays. Second, X must be small enough to allow for sufficient vector registers.

Referring again to FIG. 6, note that a pipeline delay of two cycles exists. In order to cover this pipeline delay, X must be at least 2. According to the preferred embodiment of the present invention, X=4. Therefore, X is more than sufficient to cover the pipeline delay of two cycles. Small processing advantages are achieved by having X exceed the amount necessary to cover pipeline delay.

Referring to FIG. 3, each PE 116 contains 32 registers. As noted above, 4 registers are allocated for scalar operations (that is, register V7(0)–V7(3)). That leaves 28 registers for vector operations. If X=4, then 4 registers are required for each vector register. Thus, 7 vector registers would be available. This is the case in FIG. 3. X could be increased to 8. However, this would allow only four vector registers (each having the ability to store 8 array elements) and would allow no scalar registers. Even if scalar registers were not required, having only four vector registers would seriously limit the ability of the register allocator 222 to perform its duties satisfactorily. As a general rule, the PEs 116 should have at least seven vector registers.

Therefore, selecting a value for X involves a tradeoff between covering pipeline delays and having sufficient vector registers. The value of X will necessarily depend on the specific hardware used. With the hardware shown in FIG. 3, the timing of the vector instructions, and with a pipeline delay of two cycles, a value of X=4 is long enough to cover the pipeline delays but short enough to allow for a sufficient number of vector registers.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of transforming a strip mined lowered intermediate representation ("IR") of a source program to a low level program adapted for use with a data parallel computer having multiple processing elements, each of the processing elements having multiple pipelined functional units, the lowered IR having one or more code blocks, each of the code blocks having inline elemental vector instructions which operate on arrays, wherein all arrays in a code block have an identical size and layout, said method comprising the steps of:

(1) generating assembly language code representing the elemental vector instructions such that said assembly language code comprises a plurality of low-level vector instructions, each of said low-level vector instructions when executed in a processing element of the data parallel computer enabling said processing element to execute in a pipelined functional unit a series of elemental operations each involving at least one array element stored in said processing element, said series of elemental operations each enabling performance of a function specified by said each of said low-level vector instructions, wherein execution of a predetermined number of said operations is complete prior to initiating execution of an ensuing low-level vector instruction in said processing element, said predetermined number selected so as to reduce deleterious effects of pipeline delays in said pipelined functional unit; and (2) scheduling execution of said low-level vector instructions by the processing elements of the data parallel computer such that at least some of said low-level vector instructions are executed in parallel in the processing elements of the data parallel computer.

2. The method of claim 1 in which during execution of said assembly language code in the data parallel computer elements of the arrays are evenly distributed to the processing elements, wherein step (1) comprises the steps of:

(a) selecting one of the code blocks;

(b) generating subgrid loop creation instructions to create a subgrid loop, wherein said subgrid loop creation instructions when executed in said processing element enable said processing element to process, over a predetermined number of iterations of said subgrid loop, the elements of the arrays distributed to said processing element, wherein X represents a value of an iteration counter; and (c) providing said subgrid loop creation instruction in said assembly language code.

3. The method of claim 2 in which said selected code block comprises an elemental vector instruction designating a particular operation to perform using elements of at least one of the arrays, wherein step (1) further comprises the steps of:

(d) generating a low-level vector instruction representing said elemental vector instruction, wherein said low-level vector instruction when executed in said processing element enables said processing element to perform said particular operation using a subset of the elements of said at least one of the arrays distributed to said processing element; and (e) providing said low-level vector instruction in said assembly language code such that said low-level vector instruction is executed by said processing element during each iteration of said subgrid loop.

4. The method of claim 3, wherein said elemental vector instruction is a vector load instruction, and wherein said low-level vector instruction when executed in said processing element enables said processing element to retrieve X array element values from a memory and to store said retrieved values in a vector register.

5. The method of claim 3, wherein said elemental vector instruction is a vector arithmetic instruction, and wherein said low-level vector instruction when executed in said processing element enables said processing element to perform an arithmetic operation designated by said vector arithmetic instruction using X array element values stored in one or more vector registers.

6. The method of claim 2 in which said selected code block comprises a plurality of elemental vector instructions designating particular operations to perform using elements of a plurality of arrays, wherein said step (b) comprises the steps of:

determining an array size of arrays which are processed by said processing element during execution in said processing element of low-level vector instructions corresponding to said elemental vector instructions in said selected code block;

calculating said value, X, of said iteration counter as a function of said array size and as a function of predetermined indicia indicating the number of array elements processed by said processing element during each iteration of said subgrid loop; and generating said subgrid loop creation instructions such that said processing element processes the elements of the arrays distributed to said processing element over X iterations of said subgrid loop.

7. The method of claim 6, wherein said predetermined indicia indicates that four array elements are processed by said processing element during each iteration of said subgrid loop.

8. A system for transforming a strip mined lowered intermediate representation ("IR") of a source program to a low level program adapted for use with a data parallel computer having multiple processing elements, each of the processing elements having multiple pipelined functional units, the lowered IR having one or more code blocks, each of the code blocks having inline elemental vector instructions which operate on arrays, wherein all arrays in a code block have an identical size and layout, said method comprising:

(1) a code generator for generating assembly language code representing the elemental vector instructions such that said assembly language code comprises a plurality of low-level vector instructions, each of said low-level vector instructions when executed in a processing element of the data parallel computer enabling said processing element to execute in a pipelined functional unit a series of elemental operations each involving at least one array element stored in said processing element, said series of elemental operations each enabling performance of a function specified by said each of said low-level vector instructions, wherein execution of a predetermined number of said operations is complete prior to initiating execution of an ensuing low-level vector instruction in said processing element, said predetermined number selected so as to reduce deleterious effects of pipeline delays in said pipelined functional unit; and (2) a scheduler for scheduling execution of said low-level vector instructions by the processing elements of the data parallel computer such that at least some of said low-level vector instructions are executed in parallel in the processing elements of the data parallel computer.

9. The system of claim 8 in which during execution of said assembly language code in the data parallel computer elements of the arrays are evenly distributed to the processing elements, wherein the code generator comprises:

(a) means for selecting one of the code blocks;

(b) means for generating subgrid loop creation instructions to create a subgrid loop, wherein said subgrid loop creation instructions when executed in said processing element enable said processing element to process, over a predetermined number of iterations of said subgrid loop, the elements of the arrays distributed to said processing element, wherein X represents a value of an iteration counter; and (c) means for providing said subgrid loop creation instruction in said assembly language code.

10. The system of claim 9 in which said selected code block comprises a plurality of elemental vector instructions designating particular operations to perform using elements of a plurality of arrays, wherein said means for generating subgrid loop creation instructions comprises:

means for determining an array size of arrays which are processed by said processing element during execution in said processing element of low-level vector instructions corresponding to said elemental vector instructions in said selected code block;

means for calculating said value, X, of said iteration counter as a function of said array size and as a function of predetermined indicia indicating the number of array elements processed by said processing element during each iteration of said subgrid loop; and means for generating subgrid loop creation instructions such that said processing element processes the elements of the arrays distributed to said processing element over X iterations of said subgrid loop.

11. The system of claim 10, wherein said predetermined indicia indicates that four array elements are processed by said processing element during each iteration of said subgrid loop.

12. A method for transforming a strip mined lowered intermediate representation (IR) of a source program into a low level program adapted for use with a data parallel computer having multiple processing elements, each of the processing elements having multiple pipelined functional units, the lowered IR having one or more code blocks, each of the code blocks having inline elemental vector instructions which operate on arrays, wherein all of the arrays in a code block have an identical size and layout, and wherein during execution of the low level program in the data parallel computer elements of the arrays are evenly distributed to the processing elements, said method comprising the steps of:

(a) selecting one of the code block, wherein said selected code block comprises at least one elemental vector instruction designating a particular operation to perform using elements of at least one of the arrays;

(b) generating subgrid loop creation instructions to create a subgrid Iccp, wherein said subgrid loop creation instructions when executed in a processing element enable said processing element to process, over a predetermined number of iterations of said subgrid loop, the elements of the arrays distributed to said processing element;

(c) generating a low-level vector instruction representing said elemental vector instruction in said selected code block, wherein said low-level vector instruction when executed in said processing element enables said processing element to perform said particular operation using a subset of the elements of said at least one of the arrays distributed to said processing element; and (d) providing said subgrid loop creation instructions and said low level vector instructions in the low-level program with such that said low-level vector instruction is executed by said processing element during each iteration of said subgrid loop.

13. The method of claim 12, wherein said step (b) comprises the steps of:

(1) determining an array size of arrays which are processed by said processing element during execution in said processing element of low-level vector instructions corresponding to elemental vector instructions contained in said selected code block;

(2) calculating said predetermined number as a function of said array size and as a function of predetermined indicia indicating the number of array elements processed by said processing element during each iteration of said subgrid loop; and (3) generating said subgrid loop creation instructions such that said processing element processes the elements of the arrays distributed to said processing element over a number of iterations of said subgrid loop corresponding to said predetermined number.

14. The method of claim 13, wherein said calculating step comprises the step of dividing said array size by said predetermined indicia to thereby generate said value, X, of said iteration counter.

* * * * *